United States Patent Office 3,065,215
Patented Nov. 20, 1962

3,065,215
CATALYTIC POLYMERIZATION WITH YLID CATALYSTS
Louis de Vries, Richmond, Calif., assignor to California Research Corporation, San Francisco, Calif., a corporation of Delaware
No Drawing. Filed Mar. 13, 1958, Ser. No. 721,083
1 Claim. (Cl. 260—93.5)

This invention relates to polymerization, and more particularly to the catalytic polymerization of olefins and dienes.

It is known that anions can serve as polymerization initiators in various polymerization reactions. However, the nature of the resulting product frequently will vary with the nature of the anion being used as a catalyst. For example, in the polymerization of styrene to polystyrene, it frequently is difficult with certain catalysts to obtain polystyrene of exceptionally high molecular weight.

It has now been found that the use of certain relatively new ylid chemical compounds will catalyze the polymerization of olefins and dienes, particularly styrene and isoprene, and that such catalysis will result in unusually high molecular weight polymers, particularly polystyrene.

Ylids are composed of an anion, which is the catalytically effective portion of the compound when used in the present invention, and a nitrogen or phosphorous-containing counter-ion. Ammonium and phosphonium ylids are known, and each is within the scope of the present invention. Trimethylammoniummethylid, for example, is $R_3N^{\oplus}$—$CH_2^{\ominus}$, where R is methyl. The (—$CH_2$)$^{\ominus}$, or methylene, anion is the catalytically active component when used in the present invention. The corresponding phosphonium ylid is $(CH_3)_3P^{\oplus}$—$CH_2^{\ominus}$. The ylids thus contain a potentially pentavalent nonmetallic ion, phosphorous or nitrogen. Other particular ylids within the scope of the present invention are:

Neopenthyl dimethyl (ammonium or phosphonium) methylid
Naphthyl dimethyl (ammonium or phosphonium) methylid
Phenyl dimethyl (ammonium or phosphonium) methylid
Diphenyl methyl (ammonium or phosphonium) methylid
Benzyl dimethyl (ammonium or phosphonium) methylid
Chlorophenyl dimethyl (ammonium or phosphonium) methylid
Bis-chlorophenyl methyl (ammonium or phosphonium) methylid Ylids may be prepared by various known methods; for example, a trimethylammonium-methylid lithium bromide complex in benzene may be prepared as follows:

Example I

The complex prepared as in Example I was used in the polymerization of styrene, as follows:

Example II 43.4 g. of styrene was heated in a 125 ml. flask with a trimethylammonium-methylid lithium bromide complex suspension in benzene. Half the styrene was added to the suspension during one hour. After 45 minutes, the other half was added during 45 minutes. The mixture was stirred at room temperature for two hours, at 48–60° C. for one-half hour, and at 60–74° C. for one hour. After 64 hours of standing, a polymeric substance was precipitated from the reaction mixture by means of a water treatment. The polymeric material was dried, analyzed, and identified as atactic polystyrene, with a melting range of 80–120° C. The crude polystyrene was almost completely soluble in benzene, thus demonstrating an almost completely linear structure. The intrinsic viscosity was determined to be 22.9. The molecular weight was calculated from the Staudinger relation, as follows:

$$[\mu] = KM^a$$
$$22.9 = 1.03 \times 10^{-4} M^{0.74}$$
$$M = \left[\frac{22.9}{1.03 \times 10^{-4}}\right]^{1.35} = 16,500,000$$

This unusually high molecular weight is an unexpected result of using the ylid catalyst.

Isoprene was polymerized in the presence of a trimethylammonium-methylid catalyst, as follows:

Example III

Trimethylammonium-methylid was prepared by stirring for 45 hours a mixture of 1.54 g. (0.010 mol) of tetramethyl ammonium bromide, 10.7 ml. of 1.875 M phenyllithium in ether, and 9.3 ml. of ether. The resulting ylid and tetramethylammonium bromide were isolated by filtration and washed with several portions of dry ether. The ylid was a pale green colored solid.

Example IV

One-third of the ylid produced in Example III was used to make a heterogeneous mixture with 20 ml. of benzene and 10 ml. of isoprene. The mixture was allowed to stand at room temperature overnight. Thereafter washing was accomplished with three portions of water, the benzene layer was dried over anhydrous sodium sulfate, and a resulting polyisoprene solution was obtained with a viscosity of 0.5610 centistoke at 25° C.

Example V

One-third of the ylid produced in Example III was used to make a homogeneous mixture with 20 ml. of tetrahydrofuran and 10 ml. of isoprene. The mixture was allowed to stand at room temperature overnight, and was worked up in the same manner as was used in Example IV, after addition of 20 ml. of benzene. A resulting polyisoprene solution was obtained with a viscosity of 0.6037 centistoke at 25° C.

Example VI

One-third of the ylid produced in Example III was used to make a mixture with 20 ml. of tetrahydrofuran, 10 ml. of isoprene, and 0.50 ml. of 1,2-dimethoxyethane in 10 ml. of tetrahydrofuran added slowly to generate nascent (free from lithium bromide) ylid. The resulting mixture was allowed to stand overnight at room temperature, and was worked up in the same manner as was used in Example V. A resulting polyisoprene solution was obtained with a viscosity of 0.5611 centistoke at 25° C.

From the foregoing it may be seen that by the process of the present invention unexpectedly high molecular weight polymers may be obtained, under relatively mild conditions, from olefins and dienes, particularly styrene and isoprene. The invention is most useful in connection with the more readily polymerizable olefins and dienes. Nuclear substituted styrenes and α-methylstyrene are within the scope of the invention.

What is claimed is:

The method of polymerizing a hydrocarbon selected from the group consisting of styrene and isoprene which comprises contacting said hydrocarbon with an ammonium ylid of the formula:

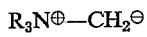

wherein R is methyl, at a temperature in the range of about room temperature to about 74° C. and at a pressure in the range of atmospheric to moderately superatmospheric.

References Cited in the file of this patent

UNITED STATES PATENTS 2,520,601  Lee ------------------ Aug. 29, 1950

OTHER REFERENCES

Witting: Chemical Abstracts, vol. 45, page 6166 (1951).

Kantor et al.: Journal of American Chemical Society, vol. 73, 4125–6, 1951.

Dannley et al.: Journal of American Chemical Society, vol. 77, 1046–8, 1955.

Schildknecht: Polymer Processes, page 39, vol. X (1956), Interscience Publishers, Inc., New York, N.Y.